June 8, 1943.    C. E. QUICK    2,321,241
LIQUID APPORTIONING DEVICE
Filed May 20, 1940
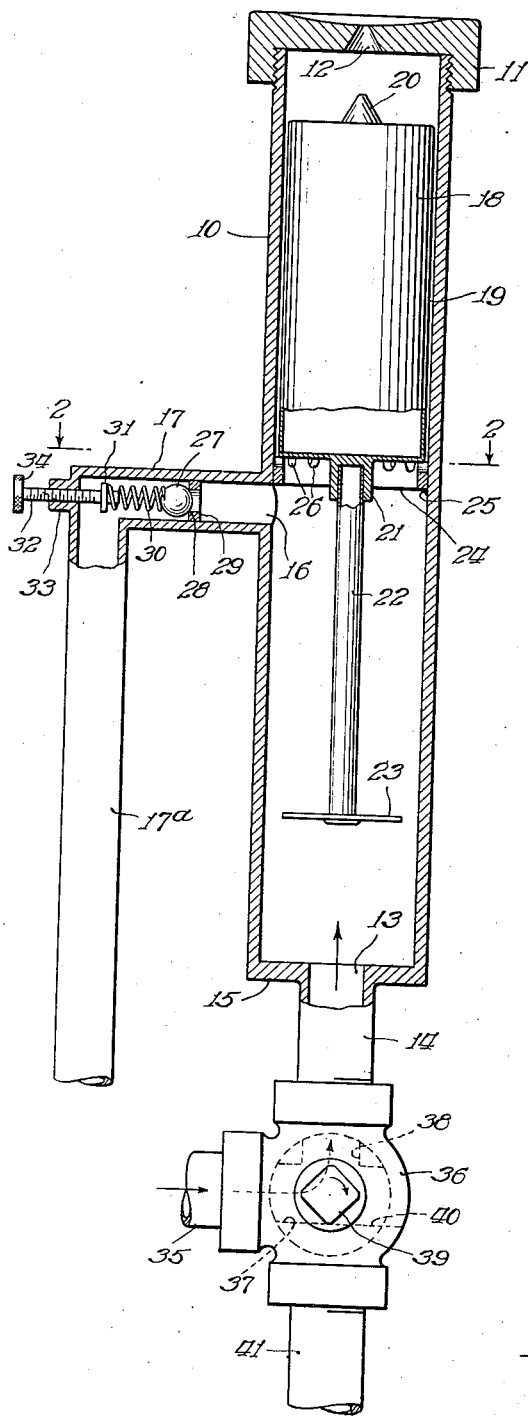
Inventor:
Claude E. Quick
By A. Trevor Jones
Atty.

Patented June 8, 1943

2,321,241

UNITED STATES PATENT OFFICE 2,321,241

LIQUID APPORTIONING DEVICE

Claude E. Quick, Glendale, Calif., assignor to Interstate Bakeries Corporation, Kansas City, Mo., a corporation of Delaware Application May 20, 1940, Serial No. 336,065

3 Claims. (Cl. 221—116)

This invention relates to liquid apportioning device, and aims to provide an improved and simplified device of this class.

An important aspect of the invention is the provision for measured portions of liquid to be delivered for any purpose, and especially where a given fairly uniform high temperature of the liquid, which may be, say, an oil, is desired to be maintained by substantially continuous circulation of the liquid under pressure through say a plurality of such devices.

The invention will be understood by reference to the accompanying drawing forming a part of this specification, and in which—

Figure 1 is an elevational view of the device, parts being shown in section; and Figure 2 is a cross-section taken on the line 2—2 of Figure 1.

Referring in detail to the illustrative construction shown in the drawing, 10 is a well casing, in this instance desirably cylindrical, and having a screw-threaded cap 11 therefor in which is an air vent 12. Alternate inlet and outlet means for the casing 10 are provided, as here shown, through a common passage 13 formed by the pipe 14 opening out of the lower wall 15 of the casing. Intermediate of the top and bottom of the casing is an overflow duct 16 provided by the pipe 17, shown here for purposes of illustration integral with the casing and leading off laterally therefrom and then downwardly as at 17a. Thus the pipes 14 and 17a are vertical or substantially so whereby the liquid therein is subject to the force of gravity, as is also the liquid in the casing 10 as presently described.

Vertically reciprocal within the casing 10 is a float 18 desirably of hollow cylindrical metal conforming in general peripheral outline to the inner circumference of the casing 10 but loosely fitting therein so as to provide an air space 19 thereabout. The float 18, as here shown, carries on its upper wall a central conical plug 20 adapted to fit the corresponding shape of the air vent 12 and to close the vent when snugly received therein. Advantageously the float on its lower wall has a depending socket 21 in which is secured, as by a force fit, a hollow metallic tube stem 22 depending downwardly concentrically of the casing 10 and terminating in a disk 23 secured to its lower end, the disk 23, however, being of substantially smaller diameter than the casing so as to occupy only a portion of the cross-sectional area thereof, thus forming a plunger member.

Downward movement of the plunger and float under the action of gravity is limited, in this instance, by the rest member 24 here shown as a ring snugly fitting the inner wall of the casing 10 and fixedly secured therein as at 25, just above the overflow duct 16, thus suspending the plunger and float in the casing. The upper edge of the ring 24 is desirably cut away at intervals as at 26 so as to permit air to pass by it and upwardly through the circumferential space 19 to pass out through the vent 12, or similarly, to permit the air to pass inwardly therethrough into the lower end of the casing.

The overflow duct 16 advantageously has a pressure responsive escape valve therein here represented by the ball 27 pressed against a spheroidal valve seat 28 in the apertured valve member 29 secured in the pipe 17 and to close the aperture therein except when moved by pressure within the casing against the force of a helical compression spring 30 abutting the ball and also abutting a collar 31 on a control rod 32. The control rod 32 may be suitably screw-threaded in an integral bearing 33 formed at the juncture between the pipe portions 17 and 17a, and may be provided with a knurled thumb-piece 34 for rotation of the control rod either to increase or decrease the pressure on the ball valve 27 as desired, and thus acting somewhat as a throttle.

The device is of particular utility, say for apportioning hot butter oil for a commercial popcorn machine, for example, such as shown in my Patent No. 2,194,074 of March 19, 1940, and the oil may be pumped from a source of supply (not here shown, but where it may be kept heated by any suitable means not necessary to be here described) to the present device, through a pipe 35. In the position of the two-way valve mechanism 36 shown in the drawing, the oil under pressure will pass from the pipe 35 through the orifices 37 and 38 up through the common inlet and outlet pipe 14 and into the interior of the well casing 10. As the oil is forced into the well casing, its level rises initially past the outlet duct 16, forcing the air in the casing upwardly ahead of it and at the same time, with the assistance of the plunger 22, lifting the float 18 to close the vent 12, whereupon by reason of the air cushion formed between the upper level of the oil and the upper end of the casing, and by reason of the valve 27, the level of the oil will be maintained at a given point so that a predetermined amount of oil will be contained in the well casing.

As will be readily understood, the amount of oil which will be contained in the device may be varied by regulating the pressure of the spring 30 on the ball valve 27, so that, if this spring pressure is reduced, by rotatively retracting the valve stem 32, the oil will begin to pass by this valve when it has reached a relatively lower level in the casing, and by moving the valve stem 32 in the opposite direction to increase the pressure of the spring 30 on the ball valve 27, the oil will not pass by the ball valve until it has reached a relatively higher level in the casing.

When, now, that predetermined amount of oil so apportioned is desired to be delivered, the two-way valve mechanism 36 may be actuated as by a handle (not shown) rigid with the valve stem 39 to actuate the valve of this valve mechanism clock-wise, as shown in the figure, closing momentarily the pipe 35 and providing an outlet from the casing through the pipe 14, the valve orifice 37 and the valve orifice 40, and downwardly by gravity through the delivery pipe 41. With the valve mechanism 36 so turned, no oil will pass into the well casing, and only its entire predetermined contents will be delivered.

As the pressure of the entrapped air between the oil level and the float 18 is diminished by closing the pipe 35 and opening the delivery pipe 41, the float will of course follow the oil downwardly as it is discharged until the float is again supported by the rest member 24, whereupon the vent 12 now being open, air may pass downwardly through the casing to aid in the discharge of the oil and prevent the formation of a vacuum in the casing, which might interfere with the oil delivery.

The interval during which the pipe 35 is so closed need be only momentary so that the oil in the pipe 35 may continue to be at all times under pressure, and as soon as the valve mechanism 36 is restored to the position shown in the drawing, exit through the pipe 41 being now prevented, the oil is again forced up into the well casing for another cycle of operation as described, the casing filling rapidly as described so that successive fixed amounts of the oil may be apportioned and delivered continually.

The parts 22—23 depending from the float, act somewhat as a plunger under the influence of the rising oil to start lifting the float (but without lifting it sufficiently to immediately close the vent 12) and thus enhance the rapidity and effectiveness of operation, being always free of the walls of the cylinder, as shown.

It will be understood also that the oil which passes by the ball valve 27 may return through the pipe 17a to the heated source of supply, from whence it is again pumped under pressure through the pipe 35 to the device, so that the oil may continue to circulate at a substantially high temperature, which may be enhanced by the maintenance of pressure throughout the circuit as described.

The vent 12 and plug 20 are both concentric with the axis of the cylinder 10 so as to be aligned in any rotative position of the float 18.

Manifestly, the invention is not limited to details of construction shown for purposes of exemplification.

I claim:

1. In a liquid apportioning device of the class described, the combination of a casing having common inlet and outlet means, an air vent at the upper part of said casing, a float in the casing adapted to close said vent under the influence of the liquid flow in the casing, a by-pass for air around said float, an outlet duct opening from said casing, a pressure responsive valve in said duct whereby the duct provides an overflow for liquid from the casing at a predetermined pressure of fluid within the casing, and operator controllable means for selectively placing the inlet and outlet means alternately in position either for entrance of liquid under pressure to the casing or for discharge of liquid by gravity therefrom.

2. In a liquid apportioning device of the class described, the combination of a vertically disposed casing having common inlet and outlet means adjacent the lower end of the casing and having an outlet duct from the casing intermediate its height, a rest member adjacent said duct within said casing above the duct, a float adapted to rest on said rest member, by-pass means for air around said rest member and float, a centrally depending stem on said float, a disk carried by the lower end of said stem spaced from the lower and side walls of said casing and providing a plunger member for moving the float under the influence of the liquid flow, an air vent located centrally of the upper wall of the casing, a plug axially carried by the float and adapted to close the vent, a spring loaded pressure responsive escape valve in said duct providing an overflow for liquid from the casing under the influence of a predetermined pressure within the casing, an adjustable member for controlling the force of said spring, and operator movable mechanism for selectively placing the common inlet and outlet means in position either for entrance of liquid under pressure to the casing or for discharge of liquid by gravity therefrom.

3. In a liquid apportioning device of the class described, the combination of a vertically disposed casing having common inlet and outlet means adjacent the lower end of the casing and having an outlet duct from the casing intermediate its height, a rest member adjacent said duct within said casing above the duct, a float adapted to rest on said rest member, by-pass means for air around said rest member and float, a centrally depending stem on said float, a disk carried by the lower end of said stem spaced from the lower and side walls of said casing and providing a plunger member for moving the float under the influence of the liquid flow, an air vent located centrally of the upper wall of the casing, a plug axially carried by the float and adapted to close the vent, a spring loaded pressure responsive escape valve in said duct providing an overflow for liquid from the casing under the influence of a predetermined pressure within the casing, and operator movable mechanism for selectively placing the common inlet and outlet means in position either for entrance of liquid under pressure to the casing or for discharge of liquid by gravity therefrom.

CLAUDE E. QUICK.